April 11, 1944.　　　C. A. BREWER　　　2,346,535
CLUTCH CONTROL MECHANISM
Filed April 28, 1932
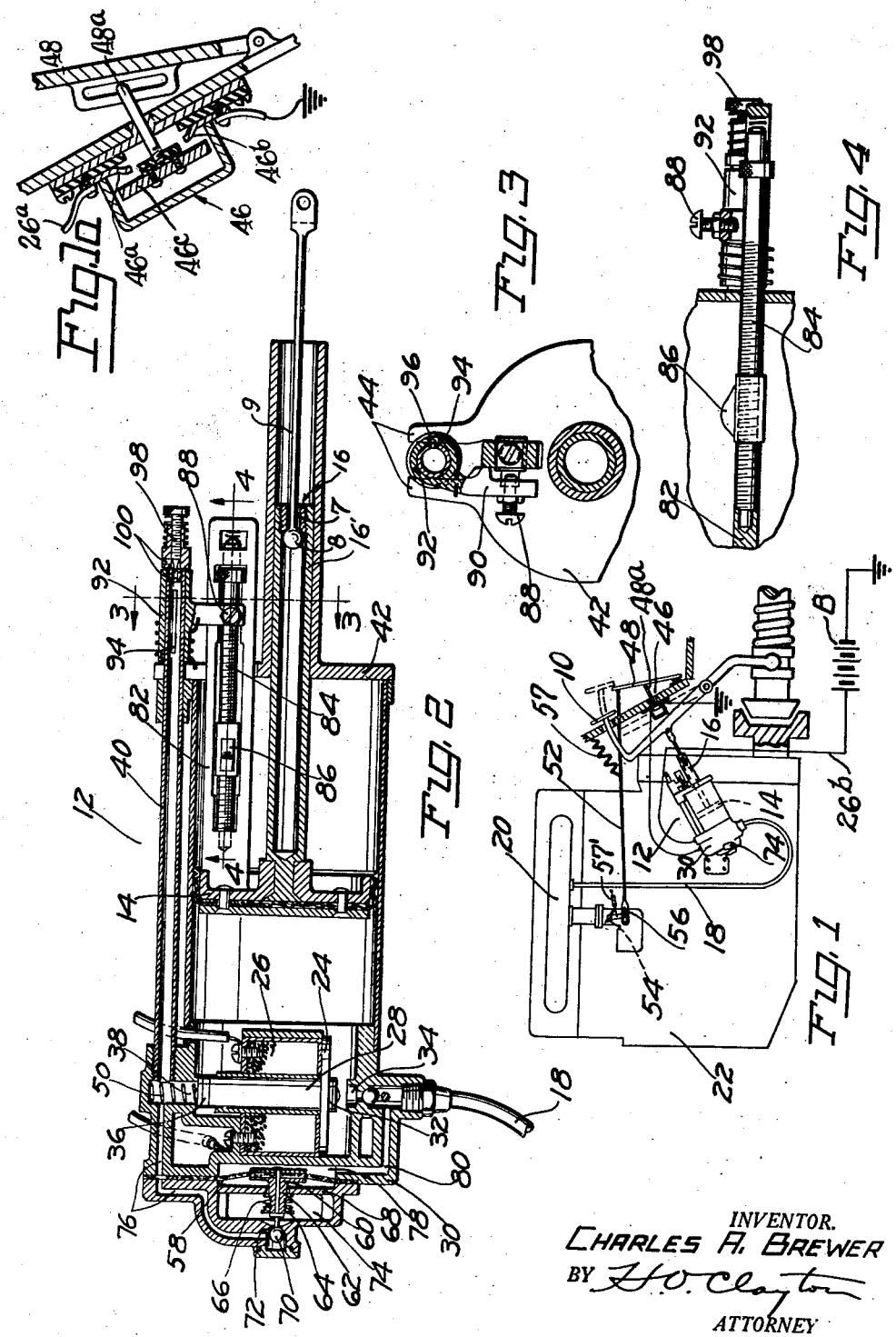
INVENTOR.
CHARLES A. BREWER
BY H. O. Clayton
ATTORNEY Patented Apr. 11, 1944

2,346,535

UNITED STATES PATENT OFFICE 2,346,535

CLUTCH CONTROL MECHANISM

Charles A. Brewer, Noroton Heights, Conn., assignor of one-half to Philip J. Kury, Arverne, N. Y.

Application April 28, 1932, Serial No. 608,107

42 Claims. (Cl. 192—.01)

This invention relates in general to clutch control mechanism for automotive vehicles and in particular to a vacuum operated mechanism of this character operable with the closing of the throttle to disengage the clutch and automatically operable with the opening of the throttle to permit a reengagement of the clutch in such fashion as to accurately simulate the corresponding manual operation of the clutch.

It is the principal object of the invention to improve upon the vacuum operated clutch controlling mechanism disclosed in the patent to Belcia No. 1,470,272, dated October 9, 1923. As disclosed in this patent, the operation, by the accelerator pedal, of a three-way control valve effects a uniform movement of the clutch pedal, which action, however, is undesirable inasmuch as too much time is consumed in engaging the clutch.

To obviate this undesirable operation of the clutch control mechanism there is suggested automatically operable means, preferably independent of the aforementioned control valve, to insure a variable rate of clutch pedal movement whereby the pedal is moved relatively rapidly during the first portion of its stroke and quite slowly thereafter and immediately prior to the actual engagement of the clutch plates. The total elapsed time consumed in effecting the clutch engagement is thus reduced to a minimum, thereby obviating the racing of the motor prior to clutch engagement and avoiding delay in accelerating the vehicle. In short, the mechanism suggested by the present invention serves to accurately simulate the conventional manual control of the clutch.

A further object of the invention is to provide means supplementing the aforementioned two-stage control means, whereby the aforementioned elapsed time is varied according to the mode of operation of the internal-combustion engine of the vehicle.

To the above end there is provided automatically operated means for controlling the clutch engaging function of the clutch mechanism, said means being variable in its operation according to the degree of manifold vacuum of the internal-combustion engine.

Another object of the invention is to provide means, cooperating with a double-ended vacuum operated motor, for controlling the rate of movement of the piston of said motor, the mode of operation of said means and the consequent mode of operation of said piston being a function of the degree of manifold vacuum, said means being operable to control the degree of gaseous pressure in the suction or active side of the motor.

A further object is to provide a clutch controlling vacuum operated fluid motor, the rate of movement of the piston element of which is controlled by angularly movable valvular means, the latter being controlled by the position of the piston within the motor, said valvular means cooperating with the aforementioned automatically operated means to effectively provide a variable rate of movement of the piston element of the motor in its clutch engaging function.

Yet another object of the invention is to provide a very compact power operated clutch control unit well suited for field installation in automotive vehicles, the motor serving as a mounting for a plurality of control valves.

Other objects of the invention and desirable details of construction, such as the details of the several valves, and combinations of parts will become apparent from the following description of a preferred embodiment, which description is taken in conjunction with the accompanying drawing, in which:

Figure 1 is a diagrammatic view illustrating the essential elements of the vacuum operated clutch controlling mechanism constituting the invention;

Figure 1a is an enlarged detail view, partly in section and with parts broken away, of one form of switch mechanism which may be employed in the embodiment of Figure 1.

Figure 2 is a longitudinal sectional view of the combined motor and valve unit constituting the essential element of the mechanism; and Figures 3 and 4 are sections taken respectively on lines 3—3 and 4—4 of Figure 2 disclosing details of part of the valvular mechanism for controlling the engagement of the clutch.

Referring now to the embodiment of the invention illustrated diagrammatically in Figure 1, there is disclosed a clutch pedal 10 adapted to operate a conventional clutch, not shown. The pedal is adapted to be moved to its clutch disengaged position, shown in full lines in Figure 1, by a fluid motor 12, a reciprocable piston 14 of which is connected to the clutch pedal by a slip joint connection 16 permitting manual operation of the clutch without effecting corresponding movement of the piston. As shown, connecting means 16 comprises a rod 9, the enlarged ball-like end 8 of which is retained in the hollow piston rod 16' by a tubular bushing 7 that threadedly engages the internal wall of said piston rod. It will be apparent that the effective length of the connection 16 may be readily adjusted by adjusting the position of bushing 7 in hollow rod 16'. The motor is preferably vacuum operated, a conduit 18 serving to interconnect one end of the cylinder of the motor with an intake manifold 20 of the internal-combustion engine 22 of the vehicle. An electrically operated valve 24 serves to control the connection between the manifold and the motor to thereby control the operation of the latter.

The control valve structure preferably comprises a solenoid winding 26 and a reciprocable spring pressed armature valve member 28, all housed within a two-piece casting 30 forming an end closure of the fluid motor. The armature member serves as a valve member at each end thereof, one end 32 cooperating with a port 34 connected with the manifold to provide an inlet or vacuum valve, and the other end 36 providing an atmospheric valve cooperating with a port 38, the latter communicating with a tubular conduit 40 rigidly supported on the motor casing at one end by the closure 30 and at the other end by a support or closure 42 forked at 44, Figure 3.

One end of solenoid 26 is connected by means of a lead 26a to a contact 46a of a suitable switch 46 and the other end thereof is connected by a lead 26b to one terminal of a suitable source of electric energy, such as a battery B. The other terminal of the battery and switch contact 46b are electrically connected through suitable ground connections. Contacts 46a and 46b are adapted to be bridged by a conduit plate 46c mounted on and insulated from the lower end of a rod 48a which is preferably pivotally secured to accelerator pedal 48, whereby switch 46 will be closed when the accelerator pedal is released. Accordingly, upon release of said pedal and consequent closing of switch 46, solenoid winding 26 is energized to open inlet valve 32. The atmospheric valve 36 is, of course, closed as the vacuum valve is opened. With the operation of the accelerator pedal and opening of the switch 46 a spring 50 serves to move the armature 28 downwardly, closing the inlet or vacuum valve 32 and opening the atmospheric valve 36, all of which will be described in greater detail hereinafter. The accelerator pedal 48 is preferably connected by a rod 52 with a butterfly operating lever 54 of the carburetor, a lost motion or slip joint 56 being provided in the connection between the rod and lever to insure an operation of the control valve 24 before the throttle is opened. The rod 52 is returned to its released position by a spring 57 and the lever 54 to a position for closing the throttle valve by a spring 57'.

As is well-known in the art, a vacuum of some twenty inches of mercury is induced in the manifold at closed throttle by the pumping action of the engine pistons, and this evacuated condition of the manifold serves, by virtue of its connection with the clutch operating motor 12, to evacuate and energize the latter to disengage the clutch; therefore, with the disclosed construction the clutch is disengaged when and if the engine throttle is closed to thereby operate the valve 24.

Briefly reviewing the operation of the mechanism thus far described, release of the accelerator pedal serves first to completely close the throttle and the last increment of movement of the accelerator permits the switch 46 to be closed to energize the solenoid and open the control valve to disengage the clutch. Actuation of the accelerator pedal effects a reversal of the above cycle of operations, the clutch being engaged as the engine speed is increased. In the clutch engaging operation of the motor atmosphere is permitted to reenter the motor via the duct or tube 40 to thus permit the conventional clutch spring to reengage the clutch plates.

The invention is particularly directed, however, to means for automatically controlling the rate of clutch engagement, that is the rate of movement of the driving clutch plate as it moves toward the driven plate. Such control of the clutch in its engaging operation is desired in order to simulate the corresponding manual control of the clutch, and more particularly to effect an engagement of the clutch plates when the R. P. M. of the driving clutch plate is equal to or approximately equal to that of the driven plate when and if the vehicle is in motion. It is furthermore desired to provide a very slow or slipping clutch movement of the driving clutch plate in starting the car from a parked condition or in reversing the direction of the car in backing up.

To the above end an automatically operable bleeder valve member is provided within the aforementioned end closure 30. This valve comprises a flexible diaphragm 58 rigidly secured at its edges between the two parts of the closure. The flexible diaphragm is provided at its center with a hub portion 60, the latter provided with a threaded stem portion 62. To one end of the stem portion there is threadedly secured a nut 64 serving as a thrust member for a spring 66 interposed between the nut and a wall 68 of the outer or cap portion of the closure 30. One end of the stem is provided with a ball valve 70 adapted to seat within and upon a valve port or seat 72, the latter providing communication between an atmospheric port 74, disclosed both in Figures 1 and 2, and a duct 76, the latter registering with the aforementioned port 38 leading to the interior of the motor. The closure 30 provides a chamber 78, to the right of the diaphragm 58, which chamber is in communication with the vacuum supply port 34 via a duct 80. The operation of the aforementioned bleed valve will be described in detail hereinafter.

There is also suggested other valvular means for controlling the engaging movement of the clutch and cooperating with the aforementioned bleed valve. This latter valvular means preferably comprises a post or extension 82 secured to the piston 14 and adjustably housing a threaded screw member 84, the latter threadedly receiving a cam member 86 relatively adjustable therewith. The cam member, with movement of the piston, is adapted to contact one end of a set screw 88, the latter being adjustably mounted in an arm 90 secured to a rotatable valve member 92 mounted upon one end of the tube 40. The tube is provided with a slot 94 adapted to register with a slot 96 in the rotatable valve member 92. There is also provided an adjustable set screw needle valve member 98, the latter determining the rate of air flow through a duct 100 interconnecting the atmosphere with the interior of the tube 40.

Describing now the complete clutch engaging operation of the invention, a depression of the accelerator pedal serves to close the control valve 24, the atmosphere being permitted to enter the clutch motor via registered slots 94 and 96. The clutch engaging movement of the clutch pedal is thus initiated, the movement being uniform until the cam 86 contacts the set screw 88 to impart angular movement to the rotatable valve member 92, cutting off communication between the atmosphere and the cylinder via the slot 94. Subsequent movement of the clutch pedal is effected by virtue of the ingress of air via the relatively small bleed valve 98, the relatively small amount of air entering the cylinder through this valve insuring a relatively slow clutch plate contacting movement of the clutch pedal as is desired.

In addition to the variable clutch engaging movement effected by the aforementioned valves there is provided the control features of the aforementioned automatically operated bleed valve. The inner side of the diaphragm 58 of this valve is subjected to the vacuum of the intake manifold by virtue of the connection provided by the chamber 78 and duct 80. When the clutch motor is evacuated and the clutch disengaged the bleed valve ball member 70 is seated to close off the connection between the atmosphere and the motor via the duct 76. This seating of the valve is insured by virtue of the pressure differential acting upon the diaphragm, the atmosphere acting upon the left side, Figure 2, and the vacuum acting on the other side.

With operation of the electrically operated control valve 24 to engage the clutch, the throttle is opened, thereby diminishing the degree of vacuum, i. e., increasing the gaseous pressure in the intake manifold and tending to establish an equilibrium of forces acting on the diaphragm 58. The compressed valve spring 66 then functions to move the ball valve 70 off its seat in proportion to the degree of manifold vacuum, providing a varied bleed of atmosphere from the opening 74 via valve opening 72 and duct 76 to thereby admit atmosphere at variable rates to the clutch motor. It will thus be apparent that the movement of the clutch pedal is, in addition to the control affected by valves 92 and 98, also affected by the rate of ingress of air into the motor via the bleed valve, this rate of ingress of air being a direct function of the degree of manifold vacuum. With a relatively small opening of the throttle as in starting or reversing the automobile there is provided a relatively slow engagement of the clutch and with the further opening of the throttle after an operation of the change-speed transmission there is provided a faster engagement of the clutch by virtue of the increased influx of atmosphere into the cylinder via the bleed valve. It will, therefore, be apparent that the total elapsed time in engaging the clutch is a direct function of the manifold vacuum which in turn is determined by the degree of throttle opening and the engine speed. This latter statement is true, inasmuch as the ingress of air to the clutch cylinder via the control valves 92 and 98 is constant and variable only by manual adjustment, the variation of time consumed in effecting either the first or last stage of movement of the clutch being determined solely by the degree of manifold vacuum. The clutch may thus be engaged slowly in starting or reversing the car and more quickly after shifting the change-speed transmission into either second or high gears. If the operator should inadvertently tramp upon the accelerator pedal and thus quickly reduce the intake manifold vacuum the clutch would be engaged quickly and before the engine and connected driving clutch plate are speeded up to exceed the speed of the driven plate. It will also be apparent that a variation in the intake manifold pressure resulting from the engagement of the clutch elements may cause the operation of valve 70 and thereby effect a variation in the rate of engagement of said elements in response to the efforts of the customary resilient means which normally bias the clutch elements toward engaged position.

There is thus provided a very simple, compact and efficient power or vacuum clutch control mechanism effective to accurately simulate a skilled manual operation of the clutch.

While one illustrative embodiment has been described, it is not my intention to limit the scope of the invention to that particular embodiment, or otherwise than by the terms of the appended claims.

I claim:

1. A clutch operating mechanism for an automotive vehicle provided with an internal-combustion engine having an intake manifold and further provided with a clutch, said operating mechanism comprising a vacuum operated fluid motor and a control valve for said motor, and means connected to said motor and manifold for controlling the clutch engaging function of said motor, said means being operable in accordance with the degree of manifold vacuum.

2. A clutch operating mechanism for an automotive vehicle provided with an internal-combustion engine having an intake manifold and further provided with a clutch, said operating mechanism comprising a vacuum operated fluid motor and a control valve for said fluid motor, and valve means connected to the suction side of said motor and also connected to said manifold, said valve means being adapted to control the clutch engaging function of said motor and being operable in accordance with the degree of manifold vacuum to determine the rate of influx of air to the suction side of said motor.

3. A clutch operating mechanism for an automotive vehicle provided with an internal-combustion engine having an intake manifold and further provided with a clutch, said operating mechanism comprising a vacuum operated fluid motor, a control valve for said motor, and valve means connected to said motor and manifold for controlling the clutch engaging function of said motor, said latter means being operable in accordance with the degree of manifold vacuum to determine the rate of influx of air into the suction side of said motor, said control valve being operable to initiate the clutch engaging operation of the motor prior to the operation of said valve means.

4. In an automotive vehicle provided with an internal-combustion engine having an intake manifold and further provided with a clutch, power operated clutch operating means connected to said clutch, said means comprising a fluid motor, a fluid transmitting connection between said motor and manifold, a control valve for controlling the fluid transmitting connection between said motor and manifold, means for operating said valve, and valve means for controlling the clutch engaging operation of the motor in accordance with the pressure in the intake manifold.

5. In an automotive vehicle provided with an internal-combustion engine having an intake manifold and further provided with a clutch, vacuum operated clutch operating means connected to said clutch, said means comprising a fluid motor, a fluid transmitting connection between said motor and manifold, a motor control valve incorporated in said connection, means for operating said valve, and means for controlling the clutch engaging operation of the motor, said last mentioned means comprising a valve member automatically operable by differentials of pressure between the atmosphere and the gaseous pressure of the intake manifold.

6. A clutch operating mechanism for an automotive vehicle provided with an internal-combustion engine and a clutch, said operating mechanism comprising a pressure differential operated motor operatively connected to the clutch, a control valve for said motor adapted to render the latter operative to effect the disengagement and control the engagement of the clutch, and valve means independent of said aforementioned control valve for controlling the engaging movement of the clutch, said valve means comprising a valve operable to effect a variable engaging movement of the clutch and further comprising another valve cooperating with said last mentioned valve to vary the engaging movement of the clutch depending upon the degree of vacuum in the manifold of the internal-combustion engine.

7. The combination with an internal-combustion engine adapted to create a vacuum, of a clutch connecting the engine with a driven mechanism, a vacuum operable device for actuating said clutch, a control valve for said vacuum operable device, and a valve controlled by the vacuum created in the engine for controlling the engaging movement of the clutch.

8. The combination with an internal-combustion engine adapted to create a vacuum, of a clutch connecting the engine with a driven mechanism, a vacuum operable device for actuating said clutch, a control valve for said vacuum operable device, a valve controlled by the vacuum created in the engine for controlling the engaging movement of the clutch, and means for adjusting said last-named valve for adapting the operation thereof to an engine having various vacuum creating capacities.

9. The combination with an internal-combustion engine having a throttle controlled intake manifold, of a clutch connecting the engine with a driven mechanism, a vacuum cylinder, a piston in said cylinder operatively connected with said clutch, a control valve for said vacuum cylinder, an exhaust conduit leading from the cylinder to the intake manifold whereby the air is exhausted by the suction created therein, and means automatically controlled by the suction in said manifold for controlling the engaging movement of the clutch.

10. The combination with an internal-combustion engine having a throttle controlled intake manifold, of a clutch connecting the engine with a driven mechanism, a vacuum cylinder, a piston in said cylinder operatively connected with said clutch, a control valve for said vacuum cylinder, an exhaust conduit leading from the cylinder to the intake manifold whereby the air is exhausted by the suction created therein, and valvular mechanism actuated by the suction of the intake manifold for controlling the engaging movement of the clutch.

11. Apparatus of the character described comprising a differential pressure power device having a movable member connected to an operating member of a motor vehicle clutch, a control device movable for establishing pressure differential in said power device to move the clutch elements to inoperative position and operative to establish pressure equalization in said power device, means automatically operative as the clutch elements reach approximately the point of initial engagement for retarding the movement of such elements, and a valve for controlling the rate of movement of the clutch elements into operative engagement in accordance with the rate of operation of the throttle of the vehicle engine in proportion to the engine speed.

12. Apparatus of the character described comprising a power device connected to an operating member of a motor vehicle clutch, control means operable for rendering said power device operative to move the clutch to inoperative position and for releasing the clutch elements for movement toward operative position, and means for controlling the latter movement of the clutch elements comprising means connected to the aforementioned clutch operating member and operated thereby and further comprising means operative in accordance with the rate of operation of the throttle of the motor vehicle engine in proportion to the engine speed.

13. Apparatus of the character described comprising a power device connected to an operating member of a motor vehicle clutch, control means operable to render said power device operative to move the clutch to inoperative position and for releasing the clutch elements for movement toward engaged position, and means for varying the rate of clutch engaging movement of the clutch elements comprising means operable to effect a relatively rapid initial clutch engaging movement, and other means for completing the engagement of the clutch, said latter means being operative in accordance with the rate of operation of the throttle of the motor vehicle engine in proportion to the engine speed for controlling the rate of operation of the clutch elements into engagement with each other through said last named means.

14. Apparatus of the character described comprising a power device connected to an operating member of a motor vehicle clutch, control means operable for rendering said power device operative to move the clutch to inoperative position and for releasing the clutch elements for movement toward operative position, and means for controlling the last mentioned movement of the clutch elements comprising control means operable in accordance with the rate of operation of the throttle of the motor vehicle engine in proportion to the engine speed for controlling the rate of movement of the clutch elements into engagement wtih each other through said last named means.

15. Apparatus of the character described comprising a power device connected to an operating member of a motor vehicle clutch, control means operable for rendering said power device operative to move the clutch to disengaged position and for releasing the clutch elements for movement toward engaged position, and means for controlling the clutch engaging movement of the clutch elements comprising means controlled by the rate of operation of the throttle of the motor vehicle engine in proportion to the engine speed for controlling the rate of movement of the clutch elements into engagement with each other through said last named means.

16. In an automobile with its clutch, the combination of a clutch actuator and mechanism for automatically operating said clutch actuator, said mechanism including a power cylinder having port means effecting quick movement of the actuator for the first portion of its movement in the direction of clutch engagement and slow movement of the actuator in the remaining portion of its movement in the direction of clutch engagement, and accelerator controlled means for said power cylinder adapted to control the rate of movement in said remaining portion.

17. In an automatic clutch operating mechanism for automobiles having a throttle and throttle operating means, a source of vacuum, a vacuum cylinder and piston mechanism provided with means for vacuum connection and for air relief, and means for controlling the air relief associated with said cylinder and piston mechanism to afford relatively unrestricted relief during the first part of a stroke of the piston and controllable relief for the remainder of such stroke including valve means influenced in its action by throttle operation.

18. In an automobile with its clutch, the combination of a clutch actuator and mechanism for automatically operating said clutch actuator, said mechanism including a fluid chamber having port means effecting quick movement of the actuator for the first portion of its movement in the direction of clutch engagement followed by relatively slow movement of the actuator in the direction of clutch engagement, and accelerator controlled means for said mechanism adapted to control the rate of movement following said first portion.

19. In an automatic clutch operating mechanism for an automobile having a throttle and throttle operating means, a source of vacuum, mechanism comprising a fluid chamber and a member movable in said chamber, said mechanism being provided with means for vacuum connection and for air relief, and means for controlling the air relief associated with said mechanism to afford relatively unrestricted relief during the first part of a stroke of said member followed by relatively restricted relief, said means including valve means influenced in its action by throttle operation.

20. In an automatic clutch operating mechanism for an automobile having a throttle and throttle operating means, a source of vacuum, mechanism comprising a vacuum chamber and a member movable therein, control valve means for said mechanism providing vacuum connection and air relief, valve means connected to be moved by said member for controlling the air relief, and valve means influenced in its action by the operation of said throttle operating means for controlling the air relief.

21. In clutch operating mechanism for automobiles, a source of vacuum, a vacuum cylinder and piston mechanism provided with means for vacuum connection and for air relief, and means for controlling the air relief including a housing, a diaphragm therein, a valve operatively connected to the diaphragm for controlling air relief in proportion to the differential pressure acting on said diaphragm, one side of said diaphragm being subjected to atmospheric pressure and the other side of said diaphragm being subjected normally to less than atmospheric pressure, and yielding means for biasing the valve.

22. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means and to permit the engagement of said clutch elements in response to the operation of said resilient means, and fluid pressure actuated means responsive to variations in pressure in said intake manifold of said engine for changing the normal rate of engagement of said clutch elements in response to the operation of said resilient means.

23. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means and to permit the engagement of said clutch elements in response to the operation of said resilient means, and fluid pressure actuated means responsive to variations in intake manifold pressure resulting from the engagement of said clutch elements for varying the rate of engagement of said clutch elements in response to the operation of said resilient means.

24. The combination with a motor vehicle engine and a clutch therefor provided with an operating member having a normal bias toward clutch engaged position, of a power device connected to the clutch operating member, means under the control of the vehicle operator for establishing a pressure differential in said power device to move said clutch to inoperative position, and cooperating means controlled by engagement of said clutch of such rapidity as to reduce the speed of said engine, during movement of said clutch from inoperative position towards engaged position, for modifying the speed of engagement of said clutch.

25. In an automotive vehicle provided with a drive shaft and an internal-combustion engine having an intake manifold and further provided with a clutch for controlling the connection between the engine and drive shaft, pressure differential operated means for operating said clutch, a control valve for said pressure differential operated means, and means for controlling the clutch engaging function of said clutch operating means, said controlling means being automatically operable with changes in the degree of gaseous pressure within said manifold to thereby control the engaging movement of said clutch.

26. In an automotive vehicle provided with a drive shaft and an internal-combustion engine having an intake manifold and further provided with a clutch for controlling the connection between the engine and drive shaft, vacuum operated means for operating said clutch, a control valve for said vacuum operated means, and valve means for controlling the clutch engaging function of said clutch operating means, said valve means being automatically operable with changes in the degree of gaseous pressure within said manifold to thereby control the engaging movement of said clutch.

27. In an automotive vehicle provided with a drive shaft and an internal-combustion engine having an intake manifold and further provided with a clutch for controlling the connection between the engine and drive shaft, vacuum operated means for operating said clutch, a control valve for said vacuum operated means, and valve means for controlling the clutch engaging function of said clutch operating means, said valve means being automatically operable with changes in the degree of gaseous pressure within said manifold to thereby control the engaging movement of said clutch and comprising a movable part operable by differentials of pressure caused by said changes in manifold pressure.

28. In an automotive vehicle provided with an internal-combustion engine having an intake manifold and further provided with a clutch, a throttle for controlling the operation of said internal-combustion engine, and means for operating said throttle, vacuum operated clutch operating means connected to said clutch, said operating means comprising a fluid motor, a fluid transmitting connection between said motor and manifold, a motor control valve for controlling the fluid transmitting connection between said motor and manifold, means for operating said valve, and means for controlling the clutch engaging operation of the motor in accordance with the pressure in the intake manifold, said control valve operating means being operable in conjunction with the aforementioned throttle operating means in such a manner that the control valve is operated prior to the operation of the throttle, whereby said control means is operated subsequent to the operation of the motor control valve.

29. A clutch operating mechanism for an automotive vehicle provided with an internal-combustion engine and a clutch, said operating mechanism comprising a pressure differential operated motor operatively connected to the clutch, a control valve for said motor adapted to render the latter operative to effect respectively the disengagement and engagement of the clutch, and valve means independent of said aforementioned control valve for controlling the engaging movement of the clutch, said valve means comprising a valve operable to effect a variable clutch engagement and further comprising another valve cooperating with said last mentioned valve to vary the engagement of the clutch depending upon the degree of vacuum in the manifold of the internal-combustion engine, all of said aforementioned valves being operative to control the gaseous pressure on one side of the piston of said motor.

30. In a motor vehicle having an engine, a clutch, a throttle and operating means for the latter, the combination comprising a power device including a pair of relatively movable elements forming a fluid chamber, means connecting one of said elements to an operating member of said clutch, means connecting said chamber to atmosphere, and valve means for controlling said last-named connecting means including a solenoid operated valve, the circuit to said solenoid being controlled by said throttle operating means, and a valve controlled in accordance with the rate of operation of said throttle in proportion to the engine speed.

31. In a motor vehicle having an accelerator and a clutch, the combination therewith of a fluid pressure operated power device connected to the clutch and capable of releasing it, a source of suction, means for connecting the power device with said source, means controlled by said accelerator for opening and closing said connecting means, and control means for said power device for varying the resistance of the latter to the engaging movement of the clutch, said control means including pressure differential operated means controlled in accordance with the pressure in said source.

32. In a motor vehicle having an accelerator and a clutch, the combination of a power device connected to the clutch and capable of releasing it, a source of sub-atmospheric pressure, means connecting said power device to said source and to atmosphere, valve means for controlling said connecting means, electro-magnetic means for actuating said valve means, switch means operable by said accelerator for controlling said electro-magnetic means, and pressure differential operated valve means in said atmspheric connecting means controlled in accordance with the pressure in said source.

33. In an automatic clutch operating mechanism for automobiles having a throttle and throttle operating means, a source of vacuum, a vacuum cylinder and piston mechanism provided with means for vacuum connection and for air relief and means for controlling the air relief associated with said cylinder and piston mechanism to afford relatively unrestricted relief during the first part of a stroke of the piston and controllable relief for the remainder of such stroke including valve means influenced in its action by manipulation of said throttle operating means.

34. In automatic clutch operating mechanism for automobiles having a throttle and an accelerating device controlling the throttle, a power device, a clutch actuator connected to the power device for operation thereby, main valve means for controlling said power device, means under control of the accelerating device for actuating said valve means, and other accelerating device controlled means for said power device operating to effect variable relief upon actuation of the accelerating device.

35. In automatic clutch operating mechanism for automobiles having a throttle and throttle operating means, a source of vacuum, a vacuum cylinder and piston mechanism, control valve means for said mechanism providing vacuum connection and air relief, valve means connected to be moved by the piston for controlling the air relief, and valve means controlled by the throttle operating means for controlling the air relief.

36. Apparatus of the character described comprising a power device connected to an operating member of a motor vehicle clutch, a control device operable for rendering said power device operative to move the clutch to inoperative position, and automatic means operative as the elements of the clutch approach operative position for retarding the movement of such elements, said control device including a member manually controllable for rendering said automatic means substantially ineffective for retarding the clutch elements.

37. Apparatus of the character described comprising a power device connected to a motor vehicle clutch having a normal bias to operative position, control mechanism for rendering the power device operative to move the clutch elements to inoperative position and to permit the clutch elements to return to normal position, and automatic means rendered operative as the elements of the clutch reach approximately the point of initial engagement for checking the movement of such elements, said control mechanism being subject to control independently of said automatic means for rendering the latter ineffective for substantially retarding the movement of the clutch elements.

38. In a clutch control device for motor vehicles, a power device operatively connected to the clutch and capable of releasing the same, means for connecting said power device to a source of vacuum, and control mechanism comprising means for controlling said connecting means, automatic means responsive to the movement of the clutch for controlling the degree of vacuum in said power device to vary the resistance by the latter to the engaging movement of the clutch, and means operative at the will of the operator to render said automatic means substantially ineffective for varying said resistance.

39. In an automotive vehicle provided with a clutch having a normal bias to operative position, the combination with said clutch of a control device therefor comprising a power device including a cylinder and a piston operable in said cylinder, means for operatively connecting said power device to the clutch, means for connecting one end of said cylinder to a source of vacuum, and control mechanism including means for controlling the connection to said source of vacuum for rendering the power device operative to disengage the clutch and permit the same to return to engaged position, means automatically operative as the elements of the clutch approach the point of initial engagement to control the pressure in said vacuum connected end of the cylinder for varying the resistance of the power device to the engaging movement of the clutch, and means operative at the will of the operator for rendering said last-named means ineffective for substantially varying the rate of the engaging movement of the clutch.

40. An automatic pneumatic clutch-operating mechanism for motor cars comprising, in combination, a cylinder, a clutch actuating member, a piston in said cylinder, a connection from said member to said piston adjustable as to length and means for checking the normal movement of said piston at a predetermined point in said cylinder during that portion of its travel therein which produces a clutch engaging operation.

41. Apparatus of the character described comprising a power device operatively connected to a motor vehicle clutch, a control device for said power device movable in one direction for actuating the power device to disengage the clutch and movable in the opposite direction for releasing the clutch for return movement toward engaged position, means operative when the elements of the clutch reach an intermediate position substantially at the point of initial engagement for checking the movement of such elements, means for releasing the clutch elements for movement to operative position after they have been checked in such intermediate position, an accelerator pedal connected to the throttle of the motor vehicle engine, and means operative upon depression of the accelerator pedal from idling position for rendering said last named means operative.

42. Apparatus of the character described comprising a power device operatively connected to a motor vehicle clutch, a control device for effecting actuation of said power device to disengage the clutch and to release the clutch for return movement toward engaged position, means operative when the elements of the clutch reach an intermediate position for checking the movement of such elements, means for releasing the clutch elements for movement to engaged position after they have been checked in such intermediate position, an accelerator pedal connected to the throttle of the motor vehicle engine, and means operative upon depression of the accelerator pedal from idling position for rendering said last named means operative.

CHARLES A. BREWER.